F. CHEVALIER.
JOURNALLESS ANTIFRICTION WHEEL.
APPLICATION FILED AUG. 4, 1915.

1,176,342.

Patented Mar. 21, 1916.

Inventor,
Fred Chevalier, by
G. C. Kennedy,
Attorney.

UNITED STATES PATENT OFFICE.

FRED CHEVALIER, OF WATERLOO, IOWA.

JOURNALLESS ANTIFRICTION-WHEEL.

1,176,342.

Specification of Letters Patent.

Patented Mar. 21, 1916.

Application filed August 4, 1915. Serial No. 43,538.

*To all whom it may concern:*

Be it known that I, FRED CHEVALIER, a citizen of the United States of America, and a resident of Waterloo, Blackhawk county, Iowa, have invented certain new and useful Improvements in Journalless Antifriction-Wheels, of which the following is a specification.

Figure 1:
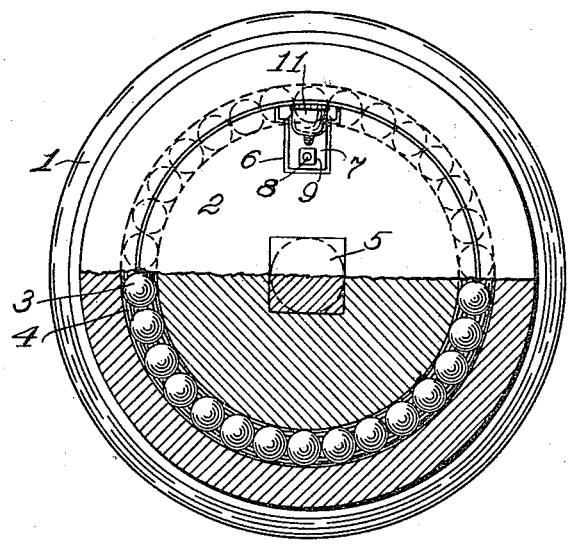
Figure 2:
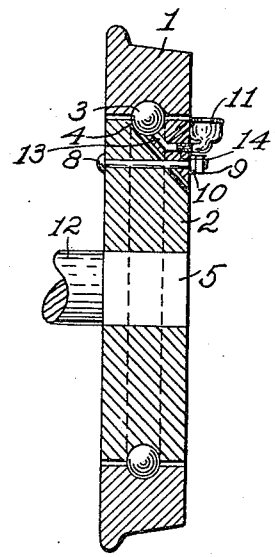
Figure 3:
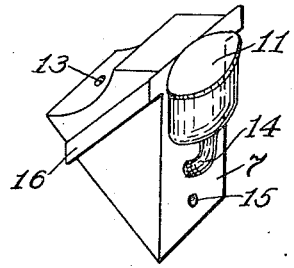

My invention relates to improvements in journalless antifriction wheels, and the object of my improvement is to supply for railway-cars or the like, carrying-wheels constructed and mounted so as to be free from heating and excessive wear such as is incidental to the use of wheel-journals seated in the ordinary types of truck-boxes. This object I have accomplished by the means which are hereinafter described and claimed, and which are illustrated in the accompanying drawings, in which:

Figure 1 is an elevation of a car-wheel constructed according to the principles of my invention, parts thereof being shown in section. Fig. 2 is a central vertical axial section of said car-wheel. Fig. 3 is a detail perspective view of the closure-body of said device and of the lubricating-vessel connected thereto.

Similar numerals of reference denote corresponding parts throughout the several views.

The car-wheel embodying my invention may be otherwise formed, but as shown, consists of a central disk 2 fixedly mounted on the squared end 5 of an axle 12, and the latter may be fixedly secured in any car-truck of the ordinary pivotal type. A tread-body 1, of annular shape, is located about said disk 2, and has the usual flanged tread surface. The parts 1 and 2 have coincident annular grooves on their abutting faces, together forming a ball raceway 4, containing a plurality of anti-friction balls 3. I have adopted the following means for permitting the introduction of said balls into said raceway. In the upper part of the fixed disk 2 is formed an upwardly sloping groove 6, entering the raceway, and of dimensions sufficient to allow balls 3 to be passed therethrough into the raceway. A closure-body 7 of wedge shape to conform to the interior of said groove 6, is fittingly seated and secured therein by the following means: Said body 7 has on its opposite sides inclined integral ribs 16 adapted to fit slidingly within similarly formed cavities in said disk and opening into the groove 6. When the body 7, with its ribs 16, is fitted in the seat thus supplied, the ribs tend to prevent sidewise movement of said body, holding it in place. The body 7 and disk 2 are orificed in line at 15 to receive a bolt 8, secured by nuts 9 and 10. The body 7 has a transverse passage 13 to permit a lubricant to be injected into the raceway 4. A small grease-cup, or container 11 for any suitable lubricant has a depending and laterally-directed spout 14, the latter having its extremity mounted within the outer opening of said passage 13, whereby the lubricant may discharge into said raceway. The parts of said wheel cannot separate from each other, and the rim or tread part 1 rotates freely and without friction upon the balls 3, doing away with heating and wear while under load, or while rotating at high speed. This peculiarly fits the device for use on railway cars or in other locations where loads must be carried by the wheel.

Having described my invention, what I claim as new, and desire to secure by Letters Patent, is:

1. In combination a fixed axial disk, an annular tread-body mounted rotatably about said disk, said disk and tread-body having coincident grooves for a raceway, anti-friction balls seated movably in said raceway, said disk having a sloping opening communicating with said raceway and grooved at the sides, a closure for said opening having side lugs adapted to be seated in said side grooves when the closure is in place to lock it releasably against sidewise movements, and means for securing said closure removably in its seat.

2. In combination a fixed axial disk, an annular tread-body mounted rotatably about said disk, said disk and tread-body having coincident grooves for a raceway, anti-friction balls seated in said raceway, said disk having at its top a sloping opening in communication with said raceway, a closure fitting said opening removably, means for removably securing said closure in said opening, said closure having an orifice in communication with said raceway, and a grease-cup mounted on said disk and in communication with said orifice.

3. In combination a fixed axle, a disk fixed centrally upon an end of said axle and having a circumferential groove about its edge, an annular body seated concentrically and rotatably about said disk and provided with a flanged tread on its outer circumferential edge and having an annular groove on its inner face opposite said other groove, both grooves constituting a ball raceway, anti-friction balls in said raceway, said disk having at its upper part an opening communicating with said raceway to permit entry or removal of said balls therefrom, and said opening having sloping lateral grooves directed downwardly in its side walls, a closure-body having downwardly sloping ribs on its sides to fit said sloping grooves and adapted to fit and close said opening, and means for detachably securing said closure-body in said opening, said closure body having a passage for lubricant in communication with said raceway.

4. In combination a fixed disk, an annular tread-body seated rotatably about said disk, both said disk and tread-body having coincident annular grooves about their abutting outer and inner edges respectively to provide a raceway, anti-friction bodies movably seated in said raceway, said disk having a passage communicating with the raceway for directing the anti-friction bodies thereinto, and a closure for said passage adapted to interlock therein to prevent sidewise displacement of the anti-friction bodies when moving past the inner end of said passage 5. In combination a fixed central bearing-body having a peripheral seat for anti-friction means, a flanged tread-body rotatably mounted about said bearing-body and upon said anti-friction means, said bearing-body having a lateral passage leading to said seat, and means for detachably stopping said passage adapted to become locked with the inner walls thereof to prevent its displacement horizontally.

Signed at Waterloo, Iowa, this 29th day of July, 1915.

FRED CHEVALIER.

Witnesses:
PEARL STANTON,
GEO. C. KENNEDY.

Copies of this patent may be obtained for five cents each, by addressing the "Commissioner of Patents, Washington, D. C."